April 1, 1924.  
A. J. COLON  
MUSICAL CHART  
Filed April 18, 1922  
2 Sheets-Sheet 1  
1,489,066
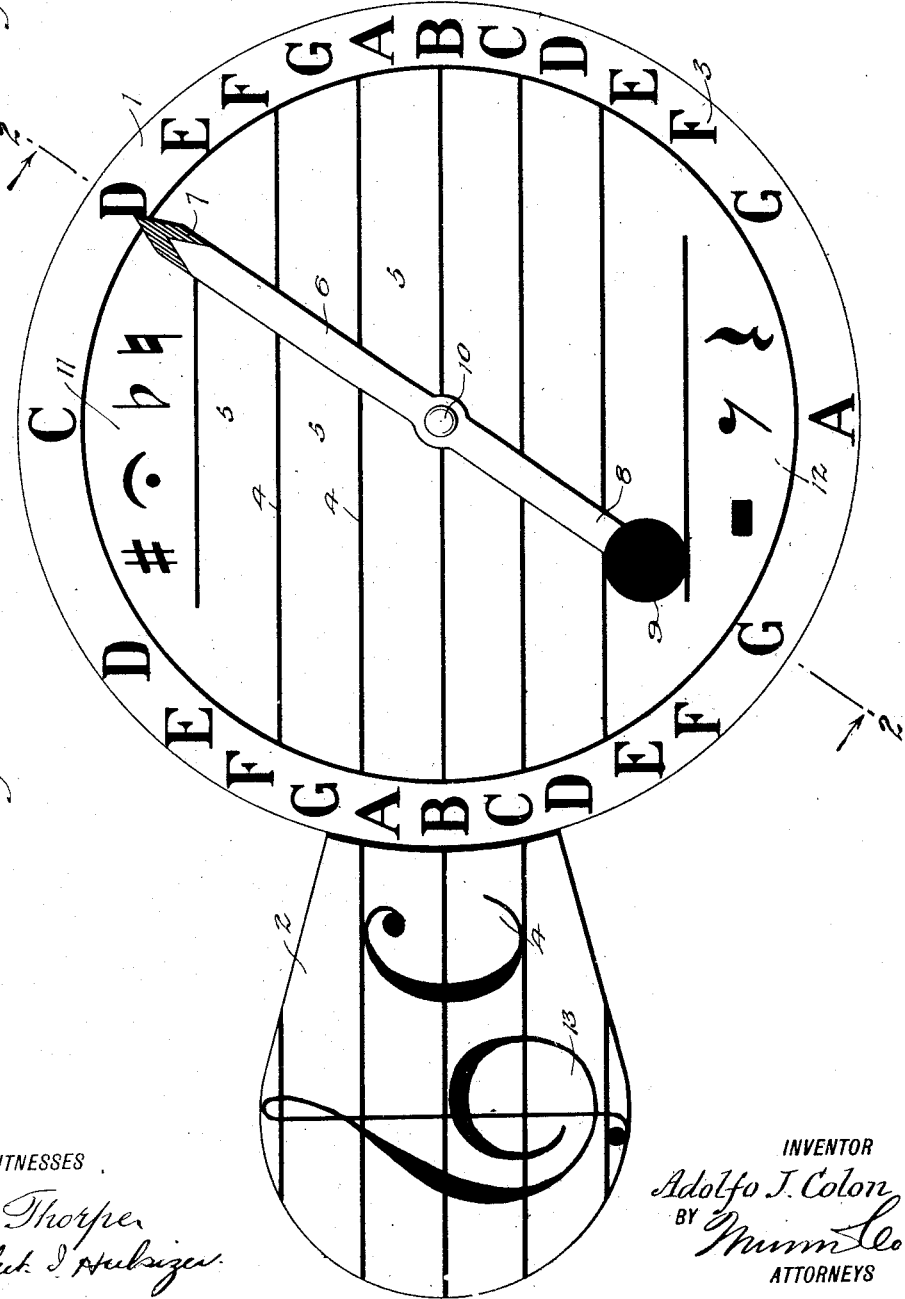
WITNESSES
INVENTOR  
Adolfo J. Colon  
BY  
ATTORNEYS April 1, 1924.
A. J. COLON
MUSICAL CHART
Filed April 18, 1922   2 Sheets-Sheet 2
1,489,066
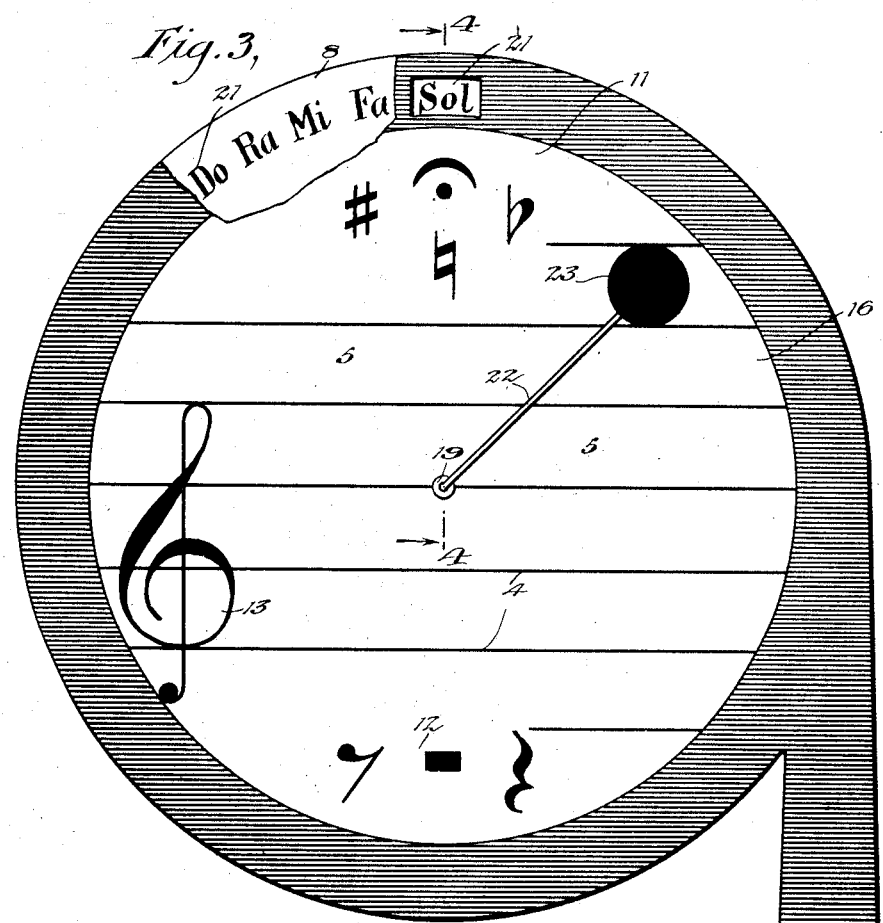
Fig.3,
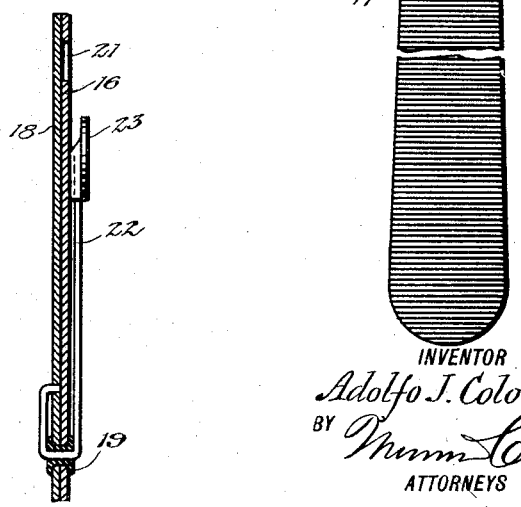
Fig.4.
WITNESSES
Edw. Thorpe
Robert I. Hulsizer
INVENTOR
Adolfo J. Colon
BY Munn & Co
ATTORNEYS Patented Apr. 1, 1924.

1,489,066

UNITED STATES PATENT OFFICE.

ADOLFO JIMENEZ COLON, OF NEW YORK, N. Y.

MUSICAL CHART.

Application filed April 18, 1922. Serial No. 555,463.

*To all whom it may concern:*

Be it known that I, ADOLFO JIMENEZ COLON, a citizen of Spain, and a resident of the city of New York, borough of Manhattan, in the county and State of New York, have invented a new and Improved Musical Chart, of which the following is a full, clear, and exact description.

This invention relates to a musical chart, and has for an object the provision of a simple, easily understandable chart whereby beginners in the study of music and musical notes can very readily learn the position of notes on the staff and thereby quickly improve their ability to read at sight.

Another object resides in the provision of means whereby the operation of the chart is rendered exceedingly simple so that any small child studying music can operate it and understand the operation.

A further object resides in the provision of a musical chart constructed in such a form that it can also be used as a fan, at the same time having the capacity of instructing the beginner in the location of the various notes on the musical staff within all ranges.

A still further object resides in the particular construction and arrangement of parts which are hereinafter described and claimed and shown in the accompanying drawings.

The invention is illustrated in the drawings, of which—

Figure 1 is a front elevation of the preferred form of my invention.

Fig. 2 is a section taken on the line 2—2 of Fig. 1.

Fig. 3 is a front elevation, with a portion broken away, of a modified form of my invention.

Fig. 4 is a section taken on the line 4—4 of Fig. 3.

The forms of the invention shown in the drawings are preferred forms, although it is understood that modifications in the construction and arrangement of the parts and in the character of the materials used may be adopted without departing from the spirit of the invention.

The invention, of which the preferred forms are shown in the drawings, comprises essentially a staff, preferably a musical staff, with which a movable indicator is associated and over which a portion of the indicator moves, so that in accordance with the position of this portion of the indicator on the staff the letter or character of that particular note is indicated by another portion of the indicator.

The main form of the invention is shown in Figs. 1 and 2 and comprises a disklike sheet 1 of any suitable material, such as cardboard, provided with a handle portion 2, so that the whole device may be used as a fan when the stiffness of the material permits. On the sheet 1, preferably around the edge thereof, are disposed a plurality of characters or indications such as 3 representing the various notes in the musical scale. Any particular scale may be chosen. On the main body of the sheet 1 I dispose a staff, preferably a musical staff, which is represented on the particular form as a treble clef with the usual bars 4 and spaces 5. Associated with and mounted on the sheet 1 is an indicator 6 having a pointer end 7 and an opposite end 8 which is enlarged as at 9 and preferably circular in shape to simulate the usual form of a note on the clef. The indicator 6 is preferably pivoted as at 10 to rotate around a pivot point, the pointer end 7 passing over the series of characters 3, and the opposite or note end 9, as I shall call it, passing over the bars and spaces of the clef or staff. The relations of the clef, the indicator 6 and the series of characters 3 are so arranged that when the pointer 7, for instance, as shown in the figure, is disposed over the character D, the note end 9 of the indicator 6 will be disposed over a space representing the location of the note D in the treble clef. Similarly, if the indicator were moved down so that the pointer note would lie over the letter E, the note end would move to a position on the scale corresponding to the location of that letter, whether it was the first bar of the clef or whether it was the fourth space. For the convenience of the pupil, I dispose on the chart the various musical notations, such as are represented by the numerals 11 and 12, representing the sharp, flat and natural keys and the various rests. It is also provided with the treble clef sign 13 and the common time character 14. The indicator 6 may be pivoted to the disk or sheet by any suitable means, such as an eyelet or rivet 15.

As shown in Figs. 3 and 4, a modified form of the invention is illustrated and comprises a front sheet or plate 16 formed circular to represent the body portion of a note, and with a stem 17 simulating the stem of an ordinary note. This front sheet is also provided with the other characteristics indicated on the previously mentioned chart. To the front sheet or plate 16 I fasten in any suitable manner a rear plate 18 of similar dimensions by any suitable means such as a hollow rivet 19. Around the edge, preferably of this rear disk, I place a series of characters 20 corresponding to those previously mentioned with respect to the other form of invention. These characters, however, are not visible from the front excepting through an aperture 21 in the front sheet 16 and only when the rear disk is disposed to bring this character to view.

Extending through the eyelet or rivet 19 and connected to the rear plate 18 is an indicating arm 22 on the end of which is the note-indicating portion 23 formed perfectly circular to simulate the appearance of a note. In the operation of this modification of the invention with, as shown, the treble clef illustrated, when the character Sol is brought opposite the aperture 21, the note indicating portion 23 will be disposed in the first place above the fifth bar of the treble clef, which is the position for Sol. As the rear disk is moved around and the various characters are brought to view at any particular instant of time, the note-indicating portion will be disposed over that part of the staff occupied by the note or character exhibited in the aperture 21.

What I claim is:

1. A musical chart which comprises a musical staff, a series of characters associated therewith, an indicator movable over a staff, a note simulating portion on said indicator, and means for indicating a particular character as the note simulting portion of the indicator is disposed over the portion of the staff occupied by that particular character or note.

2. A musical chart which comprises two sheets of material, one superposed on the other, a musical staff disposed on the front sheet, the rear sheet being movable with respect thereto, a series of characters on the rear sheet, said front sheet having an aperture through which the successive characters can be viewed as the rear sheet is moved with respect to the front sheet, a stem or indicator connected to the rear sheet and moved over the front sheet, and an indicator portion on said stem movable over the scale to indicate the location on the staff of the character viewed through the aperture or opening in the front sheet.

ADOLFO JIMENEZ COLON.